United States Patent [19]

Pauwels et al.

[11] Patent Number: 4,512,317
[45] Date of Patent: Apr. 23, 1985

[54] EXTENDED RANGE THROTTLE BODY FUEL INJECTION SYSTEM

[75] Inventors: Michael A. Pauwels, Williamsburg; Danny O. Wright, Grafton, both of Va.; Bruce J. Harvey, Sterling Heights, Mich.; Thomas J. Bauer, Newport News, Va.

[73] Assignee: Allied Corporation, Morristown, N.J.

[21] Appl. No.: 584,025

[22] Filed: Feb. 27, 1984

[51] Int. Cl.³ .................................................. F02B 3/00
[52] U.S. Cl. ..................................... 123/478; 123/490; 123/486
[58] Field of Search ............... 123/490, 478, 472, 486, 123/480

[56] References Cited

U.S. PATENT DOCUMENTS

| | | | |
|---|---|---|---|
| 4,092,717 | 5/1978 | Nunzio | 123/490 |
| 4,140,088 | 2/1979 | Vulpillieres | 123/490 |
| 4,196,702 | 4/1980 | Bowler | 123/478 |
| 4,200,063 | 4/1980 | Bowler | 123/478 |
| 4,402,294 | 9/1983 | McHugh | 123/478 |
| 4,467,771 | 8/1984 | Atago | 123/490 |

FOREIGN PATENT DOCUMENTS 24233  2/1981  European Pat. Off. ............ 123/490

*Primary Examiner*—Ronald B. Cox
*Attorney, Agent, or Firm*—Russel C. Wells

[57] ABSTRACT

An extended range throttle body fuel injection system wherein overlapping or near-overlapping fuel quantity pulse width signals are compensated to maintain the operation of the injectors in a near linear operating mode. The system is capable of being implemented in software for controlling microprocessors in a microprocessor based system or in hardware logic for operation in a hardware system.

4 Claims, 7 Drawing Figures

EXTENDED RANGE THROTTLE BODY FUEL INJECTION SYSTEM

This invention relates to microprocessor based engine control systems in general and more particularly to a system and method to extend the linear control range of a throttle body fuel injection system.

SUMMARY OF THE INVENTION

Co-pending patent application having Ser. No. 499,110, entitled "Multiprocessing Microprocessor Based Engine Control System for an Internal Combustion Engine" filed on May 27, 1983 describes a system and method for using a microprocessor based engine control system. That patent application is expressly incorporated herein by reference and describes an engine control system receiving information from several sensors representing various engine operating conditions and processing such information in dual microprocessors. The information interacts with control laws and other data and information transmitted or contained within the microprocessors to control several vehicle and engine operations such as transmission control, fuel control, EGR control, etc. In that system as well as with other fuel control systems, the electromechanical fuel injectors used therein are designed to operate with a linear function. Thus for a given pulse width the amount of fuel discharged from the injector is linearly proportional and is constant.

The linearity of the injectors being used is very good in all ranges with two exceptions. The first is at small pulse widths which is the subject of co-pending United State Patent Application entitled "A Fuel Control System for Actuating Injection Means for Controlling Small Fuel Flows" filed on Oct. 26, 1983 having Ser. No. 545,792 and is expressly incorporated herein by reference. The other exception is that at any given fuel pulse width there is a range of engine speeds where the time of completion of one pulse approaches the desired beginning of the succeeding pulse. In a multipoint sequential fuel injection system this particular operating condition represents a great amount of fuel flow relative to the minimum controlled fuel flow at the other end of the range of injector operation. However, in a single point fuel injection system, the single injector located in the throttle body, provides fuel to all cylinders and normally provides a complete opening and closing for each cylinder induction. Therefore, it is desirable to operate at a point near this range of maximum fuel flow.

The problem when operating in the range of maximum fuel flow is that at certain engine speeds the beginning of a fuel pulse can begin to interact with the end of the preceding pulse. This causes the fuel flow to be higher for a given pulse width signal than for the same time length signal at a different or lower engine speed. This non-linearity can cause loss of power, lower fuel economy and poor engine emission control.

One solution to this problem is to select an injector having sufficient capacity to provide full power fuel flow at maximum engine speed while avoiding the non-linear condition of nearly touching pulses. Unfortunately the selection of an injector with so much fuel flow causes difficulty at the lower fuel ranges for other engine operating conditions. Thus this solution compromises the dynamic range of the injector.

In order to overcome this problem and other related problems, an extended range throttle body fuel injection system which may be implemented either in hardware or software is disclosed. The time between the start of the present fuel pulse and the end of the previous or last fuel pulse is measured and used to compensate the duration of the present pulse. For a given injector design and electronic driver design, there is a repeatable relationship between the injector flow shift and the time since the last pluse. When that time is greater than a certain value, no compensation is made because the effects of pulse proximity are negligible or nonexistent. As the time since last pulse falls below such a value, the fuel flow becomes greater than that desired from the computed pulse width by a significant amount. The disclosed system will provide a compensation signal to the fuel pulse generator to shorten the present pulse width such that the total fuel flow will approximate the flow intended by the original pulse computation. This pulse shortening acts to reduce the flow in two ways: first, the shorter pulse produces less fuel in the normal time injection manner; and second, the shortening of the pulse increases the time between pulses, thereby decreasing the pulse interaction.

The microprocessor receives fixed information from a memory unit, such as a PPROM, and information from the engine sensors for generating a pulse width signal. The pulse width signal actuated the injectors for injecting a predetermined amount of fuel into the engine. The predetermined amount of fuel depends upon the actual engine conditions and the pulse width or time base of the fuel pulse is proportional to the fuel being injected into the engine. The pulse width signal is supplied to a timer such that the trailing edge of the pulse width will set the timer and the leading edge or beginning of the next succeeding pulse width will stop the timer. The timer is then read and if the time of the timer, which is the time since the last pulse, is within a certain range, the output is then inputted to a look-up table or an equation where a compensation signal is determined. This compensation signal is supplied to the microprocessor to reduce the pulse width being generated by the microprocessor by the amount of the compensation. If the timer indicates that the time since the last pulse is greater than a predetermined number, then the compensation signal is zero and the pulse width being calculated by the microprocessor is unchanged.

As a result of applying the compensation signal to the computed pulse width, the fuel flow of the injector is proportional to the original computed pulse and its output is predictable. By this means the dynamic range of the injector is extended into the range where the linearly controlled fuel flow is equivalent to an injector pulse width that is significantly greater than the actual time available between the leading edges of the pulses. Additionally, the problems of loss of power, poor emissions and poor fuel economy have been reduced.

Another advantage of this system is that high cost, high speed, injector driver designs for opening injectors faster by speeding up the response time without actually changing the minimum fuel flow of the useable flow range are not required.

These and other objects and advantages of the extended range throttle body fuel control system for large fuel flows at certain engine speeds will become apparent from the following detailed description and accompanying drawings.

DETAILED DESCRIPTION

Figure 1:
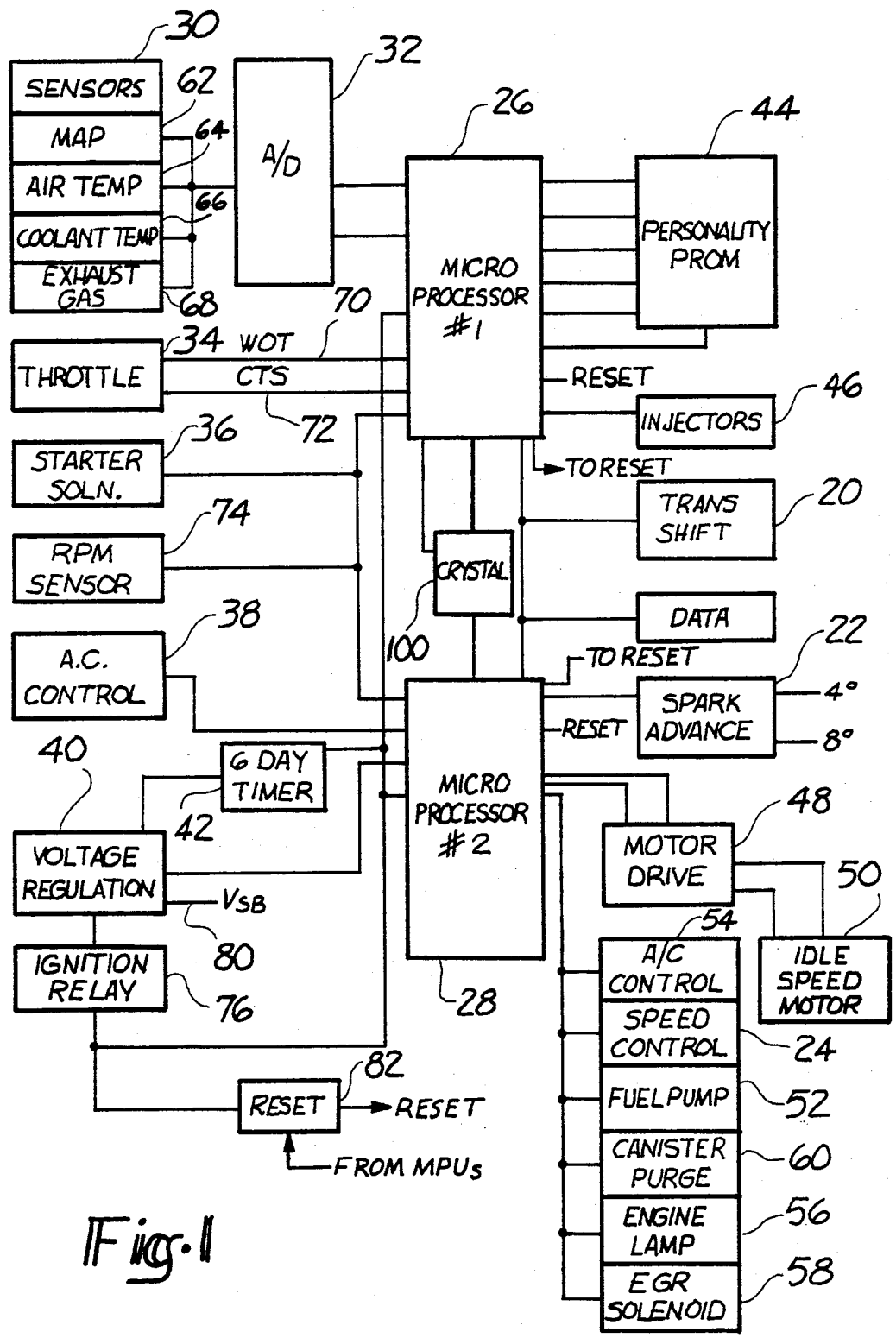
FIG. 1 is a block diagram of the microprocessor based fuel injection system.

Throughout the following description, the words "microprocessor", "processor" and "microcomputer" and "MCU" and "MPU" are used interchangeably to identify the same elements namely reference characters 26 and 28. In order to aid the reader in the understanding of the basic system, copending patent application having Ser. No. 499,110 entitled "Multiprocessing Microprocessor Based Engine Control System For An Internal Combustion Engine" filed on May 27, 1983 is expressly incorporated herein by reference.

FIG. 1 illustrates a dual microprocessor based engine control system for an internal combustion engine. The particular system is dedicated mainly to fuel management although other engine control functions such as transmission shifting 20, ignition timing and control (spark advance) 22, speed control 24, etc. may either be added or the system dedicated to such function or functions. As an example, the information generated by the microprocessors (MPU) 26 and 28 is capable of being used to control transmission shifting either by generating signals which directly actuate the shift mechanisms or by generating a lamp signal. The lamp signal is supplied through an appropriate lamp driver circuit to turn on a lamp at those times when shifting should occur. Such a lamp may be on an instrument panel in front of the engine operator.

Ignition control including spark advance 22 is also a function which the system can control. In particular in FIG. 1 the system generates two signals to advance the spark of a spark ignited internal combustion engine by either four or eight degrees. In a compression ignited engine (diesel) the timing of injection may be adjusted according to engine loads and operating characteristics.

The system is a closed loop system having a plurality of engine mountable sensors 30, an analog to digital converter 32, throttle position switches 34, a starter solenoid responsive circuit 36, air conditioner control 38 circuitry capability, means for receiving and regulating power 40 and a timer 42 all of which supply inputs to a pair of microprocessors 26, 28 interconnected in a multiprocessing configuration. Also supplying inputs to the first micro-processor 26 is a Programmable Read Only Memory (PROM) 44 which contains information peculiar to a particular engine calibration. The output devices which are actuable by one or more control signals from the MPUs 26, 28 are injectors 46, an ignition circuit 22, an idle speed actuator including a motor drive 48 and an idle speed motor 50, an electrically responsive fuel pump 52, air conditioner controls 54, an engine warning lamp 56, an EGR solenoid 58 and a control 60 for purging the fuel evaporation canister.

The plurality of engine mountable sensors 30 provide signals having informational value representing engine operating conditions. The output of each of the sensors 30 in the preferred embodiment is an analog signal which is supplied to an analog to digital (A/D) converter 32 for converting the analog signal value into a digital signal. One of the sensors is a manifold absolute pressure (MAP) sensor 62 which functions to provide information relative to the absolute pressure in the intake manifold. As is well known, the amount of manifold pressure when coupled with other information, such as speed, is an indication of the fuel requirements of the engine. In other systems, an air flow sensor, not shown, responding to the amount or mass of air being ingested into the engine also indicates fuel requirements.

A pair of temperature sensors, one for measuring the temperature of the air 64 inducted by the engine and a second for measuring the temperature of the engine coolant 66, generate output electrical signals representing the temperature of the fluid in which they are placed. For closed loop control, an exhaust gas sensor 68 is placed in the exhaust system to sense the amount of combustion of the fuel charge by the engine. In particular, an oxygen sensor measures the amount of oxygen in the exhaust gas remaining after engine combustion. The information from this sensor will regulate the fuel air ratio according to the control laws resident in the microprocessors.

The throttle position switches 34 generate an analog voltage signal which indicates the two extreme positions of the throttle valve. These positions are important to the control laws because they indicate wide open throttle (WOT) 70 and closed throttle state (CTS) 72.

The starting solenoid of the engine is operatively coupled to a starter solenoid response circuit 36 to provide a signal indicating that the engine operator is starting the engine and signifying to the control laws the need for an enriched fuel quantity signal.

A speed sensor 74 measuring the speed of an engine member, provides engine speed information. Such a sensor 74 may measure the rotational speed of the engine crankshaft of a conventional internal combustion engine or the rotor speed of a Wankel engine. Air conditioners or other heavy engine load devices are operatively coupled to a control responsive circuit 38 to generate one or more signals indicating that the load has been selected and it is operating. The microprocessor responds to various control laws to control the operation of various loads such as air conditioning units 54.

A power supply receiving means 40 receives both battery power and, through an ignition relay 76, ignition switched power 78 supplies electrical power to the control system. Unswitched battery power is used to maintain standby voltage 80 on certain volatile memories containing updated calibrations during the times that the engine is nonoperating. The ignition switched power 80 is used to power the control system during engine operating times upon demand of the engine operator.

Also contained in the power receiving means is a reset control 82 for responding to a sudden deregulation of the regulated supply voltage supplied to the microprocessors 26, 28. It is important that if there is a deregulation in the voltage, the microprocessors are immediately reset in order to prevent spurious and undesirable signals from generating incorrect data. Such a reset control system 82 is found in the commonly assigned U.S. Ser. No. 288,591 entitled "A Power Processing Reset System for a Microprocessor Responding to a Sudden Deregulation of a Voltage" filed on July 30, 1981 by Carp et al which is expressly incorporated herein by reference.

As a safety factor and in order to reduce the drain on the engine power supply during very long periods of uninterrupted nonoperability, a timer 42 which is responsive to the ignition switched power 78 is used to maintain standby voltage for a given period of time. In the preferred embodiment this time is greater than five days, although such a time is merely a design selection. When the timer 42 times out the updated engine calibrations are lost and the control system reverts back to its base line calibrations.

A Programmable Read Only Memory (PROM) which is called a Personality Programmable Read Only Memory (PPROM) 44 is provided with preprogrammed system calibration information. The PPROM 44 supplies all of the calibration constants for the engine control laws and adapts the control system to a particular engine. In particular, the PPROM 44 is a 256-byte PROM.

Figure 2:
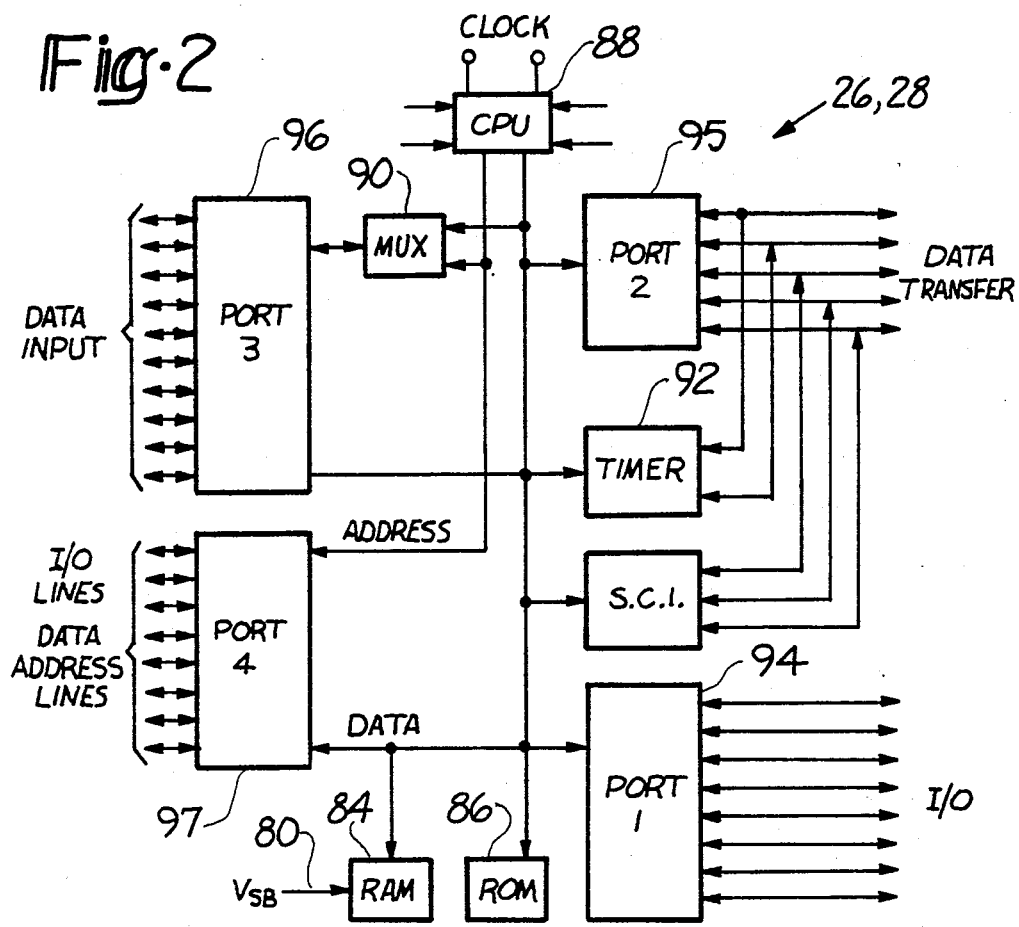
FIG. 2 is a block diagram of a microcomputer unit (MCU)

All of the above input devices supply information to either or both of the dual microprocessors 26, 28. As previously indicated a microprocessor based system is described in U.S. Pat. No. 4,255,789 which is incorporated herein by reference. The U.S. Pat. No. 4,255,789 contains a detailed description of one of the microprocessors which description is similar to the microprocessors in the preferred embodiment. The particular microprocessor unit (MPU) or microcomputer unit (MCU) used in the preferred embodiment is a Motorola, Inc. unit MC6801 which is an improved unit of the MC6800 described in the U.S. Pat. No. 4,255,789. As is well known, each MPU has storage means in the form of Random Access Memories (RAM) 84 and Read Only Memories (ROM) 86, a central processing unit 88, a multiplexor control 90, timers 92 and a plurality of input-output ports 94–97 for receiving or transmitting signals to various input-output devices. FIG. 2 is a block diagram of the microprocessors. Sometimes an MCU is defined as including an MPU, program memory and often certain I/O control. If this definition is followed the MC6800 is an MPU and the MC6801 is an MCU. In this specification the term MPU is used in the generic sense with the understanding that if an MCU is to be used the necessary modifications will be made.

The dual MPUs 26, 28 are electrically connected together in parallel to calculate from information generated by the various sensors 30, the several output control signals required by the engine control laws. The tasks required are divided by the dual MPUs wherein the first MPU 26 is assigned the task of calculating the fuel quantity signals according to stored engine control laws and calibration constants and transmitting the calculated information to the second MPU 28 for calculation of the control signals to operate various electromechanical devices controlling fuel 32, emissions 58, warning lights 56, idle speed device 48, 50 and spark ignition 22 functions.

A single frequency determining element or crystal 100 is used with the dual MPUs instead of the conventional crystal controlled oscillator with an output buffer. The single crystal 100 is so interconnected with the MPUs 26, 28 that the first MPU 26 operates as the master MPU and operates to synchronize the operation of the second MPU 28 as the slave MPU.

The fuel quantity signal or fuel pulse from the first MPU 26 is normally transmitted to the injector driver circuit 46 which is operatively connected to an electromechanical fuel injector mounted in the engine and upstream of the intake valves of the cylinders. If the system is a multipoint system, the several injectors are mounted to discharge fuel in the intake manifold upstream of the intake valve of each cylinder. If the system is a single point system, one or more injectors are mounted in the throttle body upstream of the throttle valve. In single point fuel injection systems, the selection of the proper sized fuel injector is generally a compromise between small fuel flows and large fuel flows. A co-pending U.S. Patent Application entitled "A Fuel Control System for Activating Fuel Injection Means for Controlling Small Fuel Flows" defines a small fuel flow system while herein the extended range throttle body system is described for a large fuel flow.

The fuel quantity signal determines the initiation and duration of the actuation of the injector to determine the amount of fuel injected into the engine. The injector driver circuit 46 may be that described in the commonly assigned U.S. Pat. No. 4,238,813 entitled "Compensated Dual Injector Driver" by Carp et al which issued on Dec. 9, 1980 and is expressly incorporated herein by reference.

Figure 3:
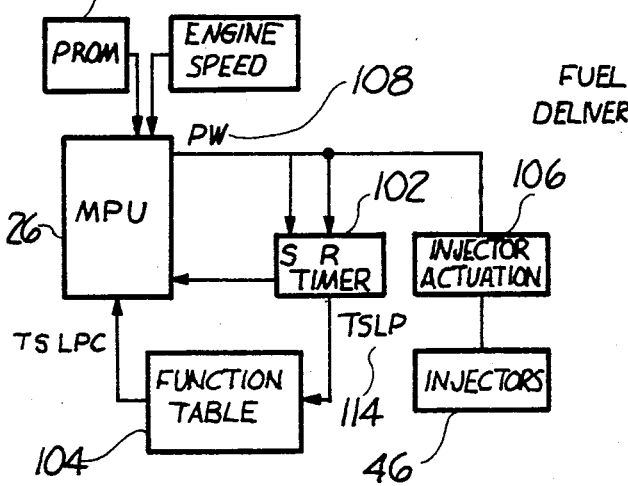
FIG. 3 is a block diagram of the large flow fuel control system.

Referring to FIG. 3 there is illustrated a block diagram of the fuel control system for extending the range of a throttle body under conditions wherein the time between fuel quantity signals is less than a predetermined time. The system comprises a timer 102, an MPU 26, a function unit 104, the PPROM 44, an injector actuation means 106 and one or more injectors 46. As previously indicated many of the digital fuel control systems are speed-density systems wherein the speed of the engine and the pressure in the manifold determine the amount of fuel to be supplied to the engine. Other systems may use the amount of air or the mass of air flowing into the engine to determine the amount of fuel demanded by the engine.

The MPU 26 generates the fuel quantity signals (PW) 108 from information received from the various sensors illustrated in FIG. 1, data stored in the PPROM 44 and the control laws stored in the microprocessor. The PW signal 108 is supplied to the injector actuation means 106 to operate the single injector 46 in the throttle body. Additionally the PW signal 108 is supplied to a timer 102 which operates to measure the time distance between successive PW signals. Thus, the timer 102 is set on the trailing edge 110 of the PW signal 108 and is stopped on the leading edge 112 of the next subsequent PW signal. When the timer 102 is halted, the value in the timer is called the Time Since Last Pulse or TLSP 114.

Figure 5:
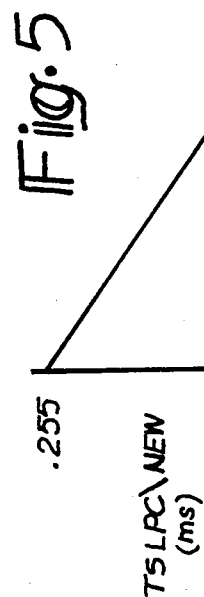
FIG. 5 is a graph illustrating compensation of the large fuel flow control system.

The pulse width of each PW signal 108 is composed of two time components. The first time component is a time calculated by the MPU 26 as previously indicated. The second time component is a compensation time value hereinafter called TSLPC 115. This second time component TSLPC 115 is subtracted from the calculated time to get the actual PW 108. It is necessary to determine the time between the last pulse and the present pulse without any consideration given to the TSLPC value. This is the net time value, T 117, defined as TSLP—(TSLPC LAST), and is supplied to a function or equation unit 104 to determine what compensation signal, if any, is necessary. The function unit 104 is constructed according to the graph of FIG. 5.

The function table 104 indicates that for TLSP 114 times having a value less than 900 microseconds there is a corresponding compensation signal. In the particular embodiment the value 900 microseconds is characteristic for a particular class of fuel injectors used in the present fuel control system. However this value can change depending on the injector, and its related system such as the injector driver, fuel pressure, etc., and is determined according to the characteristics of the injectors as shown in FIG. 4.

Figure 4:
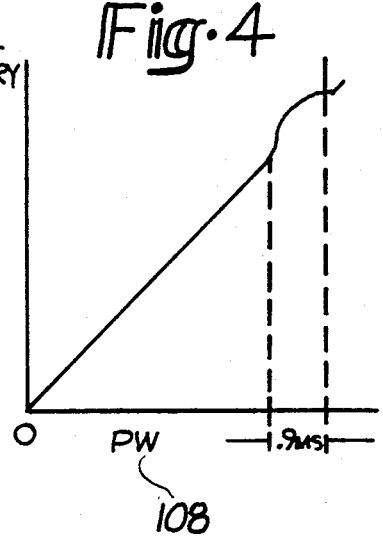
FIG. 4 is a graph of fuel delivery plotted against pulse width.

FIG. 4 is a graph plotting the PW signal 108 versus fuel delivery. The abscissa 116 of the graph of FIG. 4 is measured in time and for the purposes of this illustration the right most vertical line 118 indicates an engine speed of 6,000 RPM. This is a time between fuel pulse initiation of five milliseconds for a four cylinder engine. The ordinate 120 of the graph is fuel delivery which is measured in the weight of fuel per unit of time. The graph of FIG. 4 illustrates that, in the particular injector selected for repetitive pulses on a five millisecond period, the fuel delivery for PW pulses 108 having a time greater than 4.1 milliseconds becomes non-linear 122 shifting from the linear flow rate. The reason for this shift characteristic is that the electromechanical injector is not properly closed when the first pulse is turned off and before the following pulse turns it on. Thus with the injector never closing, the electromagnetic circuit does not settle down, therefore, the amount of fuel flowing from the injector is non-linear. For the purposes of this specification the 900 microseconds is a value determined empirically from a class of injectors and its application and such value will vary with injector design and usage.

Figure 6:
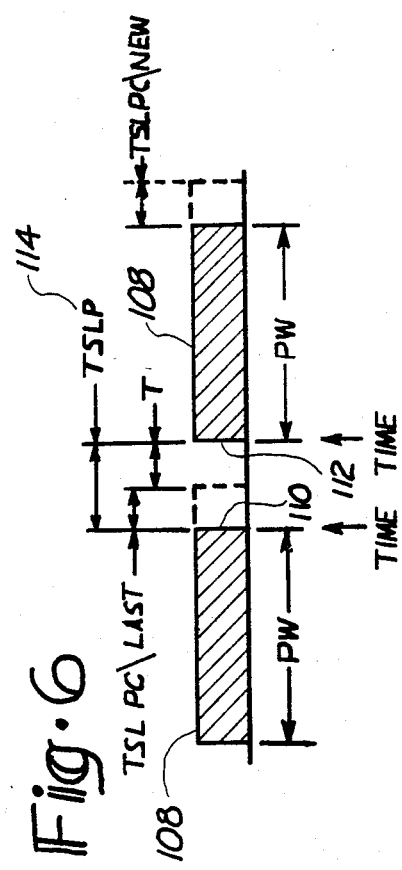
FIG. 6 is a time chart illustrating various relationships.

Referring to FIG. 6 there is illustrated the graphic definition of the PW signal 108 and its relationship to TSLP 114, the compensation value TSLPC 115, and the value T 117.

OPERATION

Figure 7:
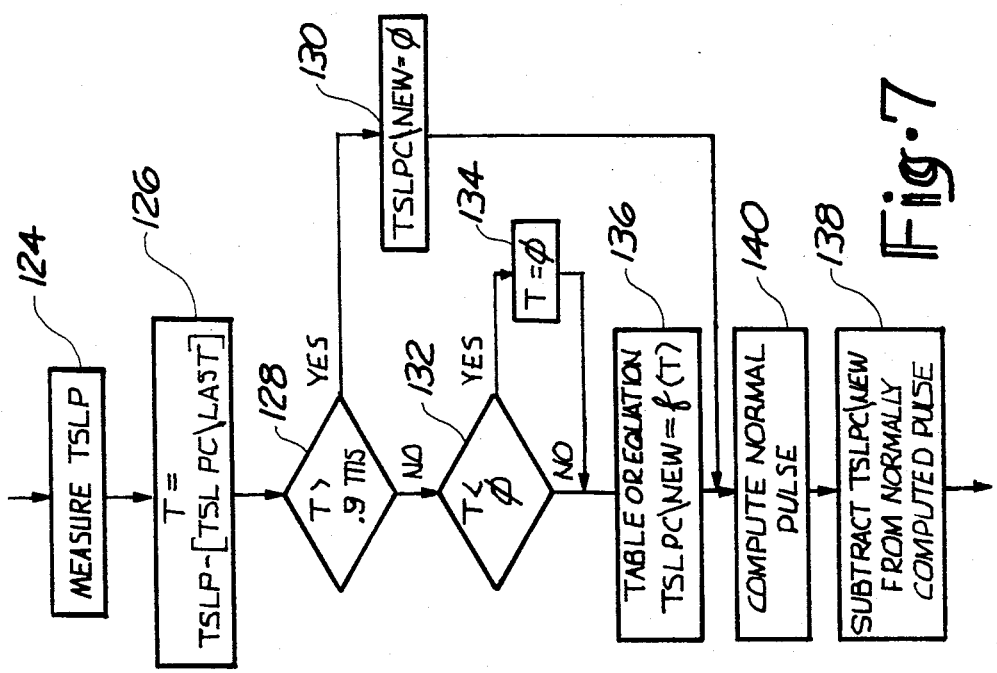
FIG. 7 is a flow chart of the large flow fuel control system.

The operation of the extended range system is best understood by referring to the flow chart of FIG. 7. This flow chart is applicable for either a hardware or a software implementation of the system. In step one 124, the timer 102 will measure the Time Since the Last Pulse and generate the signal TSLP 114. Step two 126 of the flow chart indicates that the compensation due to TSLPC 115 on the previous pulse is subtracted from TSLP 114 to create a net time value T 117. In step three 128, if T 117 is greater than a predetermined time value which is 900 microseconds or 0.9 milliseconds, the new compensation value, TSLPC, is set equal to zero and the output of the function unit 104 is zero. This is shown in the label box 130 where TSLPC NEW is zero. However if in step three 128 T is less than 900 microseconds, the value of T is checked in step four 132 to determine if it is negative or less than zero indicating that one PW signal 108 overlaps the subsequent PW signal. In this condition, the value T is set to zero in the label box 134. Since the preferred embodiment is a single point fuel injection system, an overlapped signal represents a 100% duty cycle where the injector 46 doesn't close. With the value of T between zero and 0.9 milliseconds, including both values, the compensation value for the new pulse, TSLPC NEW is calculated in step five 136 according to the equation table of FIG. 5. The new compensation time value is then supplied to the microprocessor 26 where it is subtracted 138 from the fuel quantity signal generated 140 within the microprocessor to get a compensated pulse width signal 108.

There has just been shown and described an extended range throttle body fuel control system wherein the full dynamic range of the fuel injector is utilized.

We claim:

1. An extended range throttle body fuel injection system utilizing injection means for injecting fuel into an engine, comprising:

a microprocessor having a plurality of control laws stored therein and responsive to at least one engine operating condition and in accordance with said control laws for generating a series of pulse width signals representing an amount of fuel to be injected into the engine said pulse width signal including a compensation time component and a calculated time component;

timer means responsive to the trailing and leading edges of said pulse width signals to measure the time between successive pulse width signals;

first means for subtracting from the value in said timer means said compensation time component associated with the previous fuel pulse for determining a net time value between the previous fuel pulse and the present fuel pulse;

comparison means responsive to said net time value for comparing said net time value between successive pulse width signals with a predetermined time value;

means responsive to said comparison means to generate a new compensation time value signal as a function of said net time value; and second means for subtracting said compensation time value signal from said pulse width signal to generate a compensated pulse width signal.

2. The system of claim 1 additionally including an injector actuation means responsive to said compensated pulse width signals for energizing the injection means for a time equal to the time width of the pulse width signal.

3. A method for extending the dynamic range of a fuel injector for an extended range throttle body fuel injection system, said method comprising the steps of:

generating at least two successive pulse width signals representing the amount of fuel to be injected into an engine each of said pulse width signals having a calculated time component and a compensated time component;

measuring the time between the end of the first pulse width signal and the beginning of the second pulse width signal;

subtracting from the measured time the value of the compensated time component of said first pulse width signal to get a net time value.

comparing the net time value with a predetermined time value;

calculating a new compensation time value when the net time value is less than the predetermined time; and then subtracting from the second pulse width signal the new compensation time value to get a compensated pulse width signal.

4. The method according to claim 3 additionally including the step of injecting fuel in an engine for a period of time equal to said compensated pulse width signals.

* * * * *